United States Patent
Suo et al.

(10) Patent No.: US 8,416,885 B2
(45) Date of Patent: Apr. 9, 2013

(54) METHOD AND APPARATUS FOR DATA TRANSMISSION

(75) Inventors: Shiqiang Suo, Beijing (CN); Yingmin Wang, Beijing (CN); Wengang Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 12/742,123

(22) PCT Filed: Nov. 10, 2008

(86) PCT No.: PCT/CN2008/072997
§ 371 (c)(1),
(2), (4) Date: May 10, 2010

(87) PCT Pub. No.: WO2009/067914
PCT Pub. Date: Jun. 4, 2009

(65) Prior Publication Data
US 2010/0246712 A1    Sep. 30, 2010

(30) Foreign Application Priority Data
Nov. 8, 2007  (CN) .......................... 2007 1 0177015

(51) Int. Cl.
*H04L 27/00* (2006.01)

(52) U.S. Cl.
USPC ........... 375/299; 375/260; 375/295; 375/267; 455/73; 455/101; 370/342; 370/203; 370/350

(58) Field of Classification Search .................. None
See application file for complete search history.

(56) References Cited

U.S. PATENT DOCUMENTS
2008/0260062 A1*  10/2008  Imamura ...................... 375/267

2008/0273452 A1*  11/2008  Khan et al. .................... 370/203
(Continued)

FOREIGN PATENT DOCUMENTS
CN           1879317 A        12/2006
CN         101005475 A         7/2007
WO    WO-2007038268 A1         4/2007

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)," 3GPP TS 36.211 v8.4.0 (2008).

(Continued)

*Primary Examiner* — Shuwang Liu
*Assistant Examiner* — Gina McKie
(74) *Attorney, Agent, or Firm* — Marshall, Gerstein & Borun LLP (57) ABSTRACT

A method for data transmission is disclosed. The method includes: performing, by a system, resource element mapping on modulation symbols which include data to be transmitted and reference signals and which are allocated to antenna ports of a designated type; performing antenna port mapping on the modulation symbols which are through the resource element mapping; and generating Orthogonal Frequency Division Multiplexing (OFDM) signals based on the modulation symbols which are through the antenna port mapping and transmitting the OFDM signals via physical antennas. The present invention also discloses an apparatus for data transmission. In the method and apparatus provided by the present invention, through establishing a mapping relationship between physical antenna elements and antenna ports, beamforming weights are added to modulation symbols of users at the same time. Thus, beamforming operation of the users is implemented. Accordingly, the system may support flexible beamforming transmission on frequency-domain, which greatly improves the flexibility of data transmission of the system.

1 Claim, 4 Drawing Sheets

U.S. PATENT DOCUMENTS

| | | | |
|---|---|---|---|
| 2008/0279301 A1* | 11/2008 | Khan et al. | 375/267 |
| 2009/0005120 A1* | 1/2009 | Ylitalo | 455/562.1 |
| 2009/0041150 A1* | 2/2009 | Tsai et al. | 375/267 |
| 2009/0041151 A1* | 2/2009 | Khan et al. | 375/267 |
| 2009/0154577 A1* | 6/2009 | Lindoff et al. | 375/260 |
| 2009/0304109 A1* | 12/2009 | Kotecha | 375/299 |
| 2011/0142142 A1* | 6/2011 | Jwa et al. | 375/259 |
| 2011/0312316 A1* | 12/2011 | Baldemair et al. | 455/422.1 |
| 2012/0052795 A1* | 3/2012 | Shen et al. | 455/7 |
| 2012/0115521 A1* | 5/2012 | Tong et al. | 455/501 |

OTHER PUBLICATIONS

Chinese Office Action for Application No. 2007101770155, dated Dec. 16, 2011.

* cited by examiner

METHOD AND APPARATUS FOR DATA TRANSMISSION

FIELD OF THE INVENTION

The present invention relates to mobile communication techniques, and more particularly, to a method and an apparatus for data transmission.

BACKGROUND OF THE INVENTION

At present, the third generation mobile communication technique has been fully developed and is gradually put to commercial use. Compared with previous second generation mobile communication technique, it has many technical advantages and has a broad application prospect. In order to keep the third generation mobile communication technique be updated continuously and to maintain its competitiveness for a long time, so as to prolong the commercial life-span of the third generation mobile communication technique, 3GPP is currently working on a brand-new Long Term Evolution (LTE) system to meet future requirements of mobile communications.

In current LTE systems, the following two kinds of downlink reference signals are supported.

1) Cell-specific Reference Signals (CsRS), are reference signals which can be received and utilized by all users in a cell. In an LTE system, not more than 4 antenna ports, i.e., antenna ports 0, 1, 2, 3, are defined for transmitting the CsRS.

2) UE-specific Reference Signals (UsRS), are reference signals allocated to a specific user in the cell and can only be received and utilized by the specific user. In an LTE system, one antenna port, i.e., antenna port 5, is defined for transmitting the UsRS.

The antenna ports are not concrete physical antenna ports, but are virtual antenna ports mapped from concrete physical antenna ports. Meanwhile, antenna ports in the LTE system may also be used for defining space dimensions of wireless resources. The number of space dimensions equals the number of antenna ports used.

Figure 1:
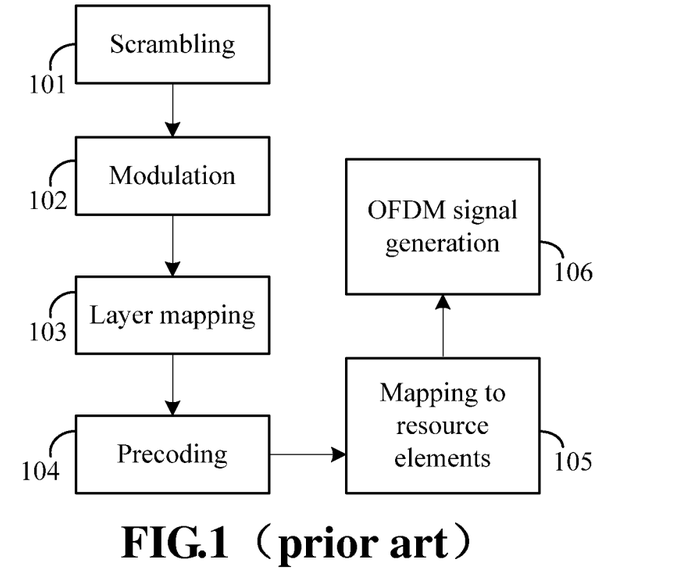
FIG. 1 is a schematic illustrating a procedure of processing a downlink physical channel according to the prior art.

In an LTE system, a general processing procedure defined for downlink physical channels is shown in FIG. 1, including the following steps.

Step 101, scrambling. Scrambling of coded bits in each code word to be transmitted on a physical channel is performed.

Step 102, modulation. Scrambled bits are modulated to generate complex-valued modulation symbols.

Step 103, layer mapping. The complex-valued modulation symbols are mapped onto one or several transmission layers.

Step 104, precoding. The complex-valued modulation symbols on each transmission layer are precoded for transmission on one or more antenna ports.

Step 105, resource element mapping. The complex-valued modulation symbols which are precoded are mapped onto resource elements of respective antenna ports.

Step 106, generation of orthogonal frequency division modulation (OFDM) signals. For each antenna port, complex-valued time-domain OFDM signals on the antenna port are generated from all complex-valued modulation symbols mapped onto resource elements of the antenna port.

The above step 105 may further include: mapping the CsRS onto resource elements of antenna ports corresponding to the CsRS to form complex-valued modulation symbols corresponding to the CsRS.

After being generated, the complex-valued time-domain OFDM signals may be transmitted through the downlink physical channels.

In existing 3GPP specifications, beamforming has been accepted as one of downlink transmission schemes. But the existing specifications do not give specific solution for beamforming transmission. And the above processing procedure does not provide sufficient support for beamforming transmission.

The reason is that the concept of beamforming has not been specified in the existing processing procedure. And there is also no detailed implementation method in the existing processing procedure. For multi-user data transmission, since different users may have different beamforming weights and different users are differentiated by frequencies, beamforming operations need to be performed on different frequency-domain resources. The existing technique only allows processing data of only one user each time. The implementation is complex and inefficient, and can not meet the requirements of downlink data transmission in a flexible way.

SUMMARY OF THE INVENTION

Embodiments of the present invention provide a method and an apparatus for data transmission, so as to flexibly support requirements of downlink data transmission.

According to an embodiment of the present invention, a method for data transmission is provided. The method includes:

performing, by a system, resource element mapping on modulation symbols to map the modulation symbols onto resource elements of antenna ports of the specific type, wherein the modulation symbols comprise data to be transmitted and reference signals and which are allocated to antenna ports of a designated type;

performing antenna port mapping on the modulation symbols which are through the resource element mapping to map the modulation symbols onto physical antenna elements corresponding to the antenna ports of the specific type; and generating Orthogonal Frequency Division Multiplexing (OFDM) signals based on the modulation symbols which are through the antenna port mapping, and transmitting the OFDM signals via physical antennas.

According to another embodiment of the present invention, an apparatus for data transmission is provided. The apparatus includes:

a resource element mapping unit, an antenna port mapping unit, an Orthogonal Frequency Division Multiplexing (OFDM) signal generator;

the resource element mapping unit is adapted to receive modulation symbols which comprise data to be transmitted and reference signals and which are allocated to antenna ports of a designated type, to map the modulation symbols onto resource elements and to transmit the modulation symbols to the antenna port mapping unit;

the antenna port mapping unit is adapted to receive the modulation symbols comprising the data to be transmitted and the reference signals from the resource element mapping unit, to map the modulation symbols onto respective physical antenna elements according to a mapping rule defined by the antenna port mapping unit, and to transmit the modulation symbols to the OFDM signal generator; and the OFDM signal generator is adapted to generate, for each antenna port, complex-valued time-domain OFDM signals on the antenna port based on all complex-valued modulation symbols mapped onto resource elements of the antenna port, and to transmit the OFDM signals via physical antenna elements corresponding to the antenna port.

In view of the above, in the method and apparatus for data transmission provided by the embodiments of the present invention, through establishing the mapping relationship between the physical antenna elements and the antenna ports, beamforming weights are added to modulation symbols of corresponding users at the same time. Thus the beamforming operation of the users is implemented. Accordingly, flexible beamforming transmission in the frequency-domain is supported and the flexibility of data transmission is greatly improved.

DETAILED DESCRIPTION OF THE INVENTION

The present invention will be described in detail hereinafter with reference to accompanying drawings and embodiments to make the technical solution and merits therein clearer.

According to an embodiment of the present invention, for a wireless communication system with multiple physical antenna elements, mapping relationships are firstly established between antenna ports and the physical antenna elements. The mapping relationships may include at least two types as follows:

1) mapping relationship I between physical antenna elements and antenna ports of type one for transmitting CsRS;

2) mapping relationship II between physical antenna elements and antenna ports of type two for transmitting UsRS.

The manner for establishing the above mapping relationships may be as follows: a wireless communication system having M physical antenna elements respectively establishes a mapping relationship I between the M physical antenna elements and P antenna ports of type one, and a mapping relationship II between the M physical antenna elements and Q antenna ports of type two.

Hereafter, the mapping relationships will be explained in detail with reference to some examples.

A. Suppose a wireless communication system has a uniform linear array with 8 elements and small spacingantenna element (i.e. M=8). Then the 8 antenna elements may be divided into two groups (suppose the indexes of the antenna elements are 0, 1, 2, 3, 4, 5, 6, 7), with each group corresponding to one antenna port of type one (i.e. P=2) and all the 8 antenna elements corresponding to one antenna port of type two (i.e. Q=1). Therefore, M=8, P=2, Q=1, as shown in table 1.

TABLE 1

|  | Physical antenna elements | Antenna port of type one | Antenna port of type two |
|---|---|---|---|
| Mapping relationship I | 0, 1, 2, 3 | 0 |  |
|  | 4, 5, 6, 7 | 1 |  |
| Mapping relationship II | 0, 1, 2, 3, 4, 5, 6, 7 |  | 0 |

Alternatively, the 8 antenna elements may also be divided into two groups (one group includes 4 antenna elements whose indexes are 0, 1, 2, 3; and the other group includes 4 antenna elements whose indexes are 4, 5, 6, 7). Each group corresponds to one antenna port of type one and one antenna port of type two. And all the 8 antenna elements further correspond to another second antenna port, i.e. M=8, P=2, Q=3, as shown in table 2.

TABLE 2

|  | Physical antenna elements | Antenna port of type one | Antenna port of type two |
|---|---|---|---|
| Mapping relationship I | 0, 1, 2, 3 | 0 |  |
|  | 4, 5, 6, 7 | 1 |  |
| Mapping relationship II | 0, 1, 2, 3, 4, 5, 6, 7 |  | 0 |
|  | 0, 1, 2, 3 |  | 1 |
|  | 4, 5, 6, 7 |  | 2 |

Alternatively, the 8 antenna elements may be divided into two groups (one group includes 4 antenna elements whose indexes are 0, 1, 2, 3; and the other group includes 4 antenna elements whose indexes are 4, 5, 6, 7), each group corresponds to one antenna port of type one, and all the 8 antenna elements correspond to two antenna ports of type two, i.e. M=8, P=2, Q=2, as shown in table 3.

TABLE 3

|  | Physical antenna elements | Antenna port of type one | Antenna port of type two |
|---|---|---|---|
| Mapping relationship I | 0, 1, 2, 3 | 0 |  |
|  | 4, 5, 6, 7 | 1 |  |
| Mapping relationship II | 0, 1, 2, 3, 4, 5, 6, 7 |  | 0 |
|  | 0, 1, 2, 3, 4, 5, 6, 7 |  | 1 |

B. Suppose a wireless communication system has a uniform linear array with 4 antenna elements and small spacing (the antenna elements are numbered with 0, 1, 2, 3). In this case, the 4 antenna elements may respectively correspond to 4 antenna ports of type one and 4 antenna ports of type two, i.e., M=4, P=4 Q=4, as show in table 4.

TABLE 4

|  | Physical antenna elements | Antenna port of type one | Antenna port of type two |
|---|---|---|---|
| Mapping relationship I | 0 | 0 |  |
|  | 1 | 1 |  |
|  | 2 | 2 |  |
|  | 3 | 3 |  |
| Mapping relationship II | 0 |  | 0 |
|  | 1 |  | 1 |
|  | 2 |  | 2 |
|  | 3 |  | 3 |

C. Suppose a wireless communication system has an antenna array of 4 dual polarized antennas. In this case, 4 antenna elements in each polarized direction of the 4 dual polarized antennas may be arranged into one group (the 4 antenna elements in one polarized direction are numbered with 0, 1, 2, 3; and 4 antenna elements in the other polarized direction are numbered with 4, 5, 6, 7). Each group respectively corresponds to one antenna port of type one and meanwhile each group respectively corresponds to one antenna port of type two, i.e., M=8, P=2, Q=2, as shown in table 5.

TABLE 5

|  | Physical antenna elements | Antenna port of type one | Antenna port of type two |
|---|---|---|---|
| Mapping relationship I | 0, 1, 2, 3 | 0 |  |
|  | 4, 5, 6, 7 | 1 |  |
| Mapping relationship II | 0, 1, 2, 3 |  | 0 |
|  | 4, 5, 6, 7 |  | 1 |

It should be noted that, the above mapping relationships are merely examples. The scope of the present invention should not be restricted to the above mapping relationships. The embodiments of the present invention have no requirement as to which mapping relationship shall be adopted.

After the mapping relationships between the antenna ports and the physical antenna elements are established, for data to be transmitted on physical channels, data to be beamformed will be transmitted via antenna ports of type two, data not to be beamformed will be transmitted via antenna ports of type one. The data transmission procedure is show in FIG. 2, including the steps as follows.

Figure 2:
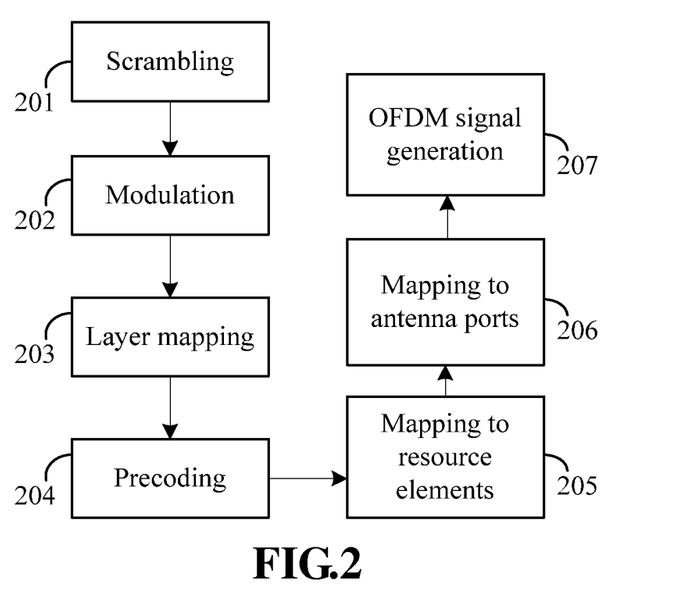
FIG. 2 is a flowchart illustrating a data transmission procedure according to an embodiment of the present invention.

Step 201 to step 204 are the same as step 101 to step 104.

Step 205, resource element mapping. The complex-valued modulation symbols allocated to antenna ports of a specific type are mapped onto resource elements of antenna ports of the specific type; the reference signals are mapped onto resource elements of corresponding antenna ports to form corresponding complex-valued modulation symbols. The reference signals may be any or a combination of the UsRS and the CsRS.

Step 206, antenna port mapping. The complex-valued modulation symbols (including complex-valued modulation symbols obtained by mapping the physical channel data and complex-valued modulation symbols obtained by mapping the reference signals) which are mapped onto resource elements of respective antenna ports are mapped onto physical antenna elements corresponding to the antenna ports.

Step 207, OFDM signal generation. On each antenna port, complex-valued time-domain OFDM signals are generated from all the complex-valued modulation symbols (including the complex-valued modulation symbols obtained by mapping the physical channel data and the complex-valued modulation symbols obtained by mapping the reference signals) mapped onto the resource elements of the antenna port.

Hereinafter, a detailed beamforming procedure of the system will be described with reference to an embodiment.

1) For data to be transmitted on a downlink physical channel, a block of bits $b^{(q)}(0), \ldots, b^{(q)}(M_{bit}^{(q)}-1)$ in code word q, where $M_{bit}^{(q)}$ is the number of bits in the code word q, shall be scrambled into a block of bits $c^{(q)}(0), \ldots, c^{(q)}(M_{bit}^{(q)}-1)$.

2) The block of bits $c^{(q)}(0), \ldots, c^{(q)}(M_{bit}^{(q)}-1)$ is modulated, resulting in a block of modulation symbols $d^{(q)}(0), \ldots, d^{(q)}(M_{bit}^{(q)}-1)$ 3) The modulation symbols $d^{(q)}(0), \ldots, d^{(q)}(M_{bit}^{(q)}-1)$ are mapped onto υ layers, expressed by $x(i)=[x^{(0)}(i) \ldots x^{(\upsilon-1)}(i)]^T$.

4) A block of symbols through the layer mapping is precoded to generate a block of signals $y(i)=[\ldots y^{(p)}(i) \ldots]^T$ to be mapped onto p antenna ports.

5) The block of signals $y^{(p)}(0), \ldots, y^{(p)}(M_{bit}^{(p)}-1)$ for each antenna port is mapped onto resource elements of the antenna port, resulting in a block of symbols $z^{(p)}(0), \ldots, z^{(p)}(M_{bit}^{(p)}-1)$.

6) After being mapped onto the resource elements, the symbols to be transmitted on N antenna ports are $z_n$ respectively. The mapping of the antenna ports is to map the symbols $z_n$ on the N antenna ports onto M physical antenna elements through the following operation:

$$S = W \cdot Z$$

wherein Z and S are respectively N×1 and M×1 column vectors, W is an M×N antenna port mapping matrix. The mapping matrix may be obtained from a specific beamforming algorithm or be determined by the system in advance. By virtue of the mapping matrix, the system is able to add beamforming weights to modulation symbols of multiple users at a time. Therefore, multi-user beamforming operation is realized.

7) OFDM signals are generated based on the mapped symbols and then transmitted via the physical antennas.

It should be noted that, three kinds of signals are transmitted when the system performs downlink data transmission: UsRS, CsRS and data to be transmitted. When the system transmits downlink data, code words in the data to be transmitted are firstly scrambled and mapped onto corresponding modulation symbols in a modulator; then the data to be transmitted are mapped onto different transmission layers through layer mapping and then to be mapped onto different antenna ports through precoding. The precoding is to obtain a diversity gain of the signals. The processing of the data stream after precoding includes the following two situations.

A. When beamforming is not to be performed, resource element mapping is performed, and the modulation symbols including the CsRS and the data stream are mapped onto corresponding resource blocks, and then mapped onto corresponding physical antenna elements through antenna port mapping. In this situation, the data processing is the same as that in the prior art and therefore will not be repeated herein.

B. When beamforming is to be performed for transmission, the system needs to transmit UsRS corresponding to each user. In this situation, the modulation symbols including the precoded data stream and the UsRS are mapped onto corresponding resource blocks through resource element mapping, and then the resource blocks occupied by the UsRS are mapped onto the antenna ports through antenna port mapping.

Figure 3:
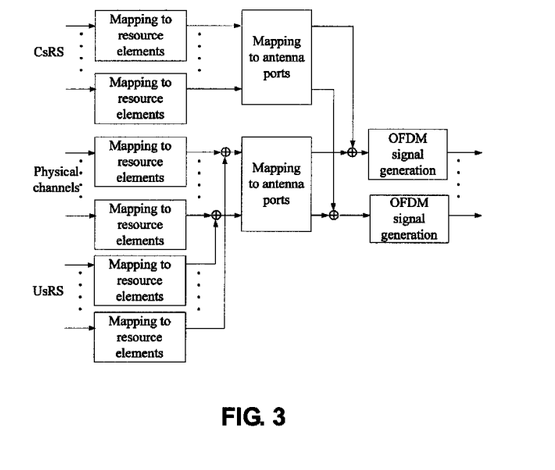
FIG. 3 is a flowchart illustrating a procedure of performing resource mapping and antenna port mapping according to an embodiment of the present invention.

In this case, one processing procedure of the system is shown in FIG. 3. The UsRS and the physical channel data are respectively processed through resource mapping. After the resource mapping, the modulation symbols including the mapped UsRS and the physical channel data are processed through antenna port mapping. At the same time, beamforming weights are respectively added to the modulation symbols. Finally, OFDM signals are generated based on the modulation symbols after the antenna port mapping and are then transmitted via the physical antennas.

Figure 4:
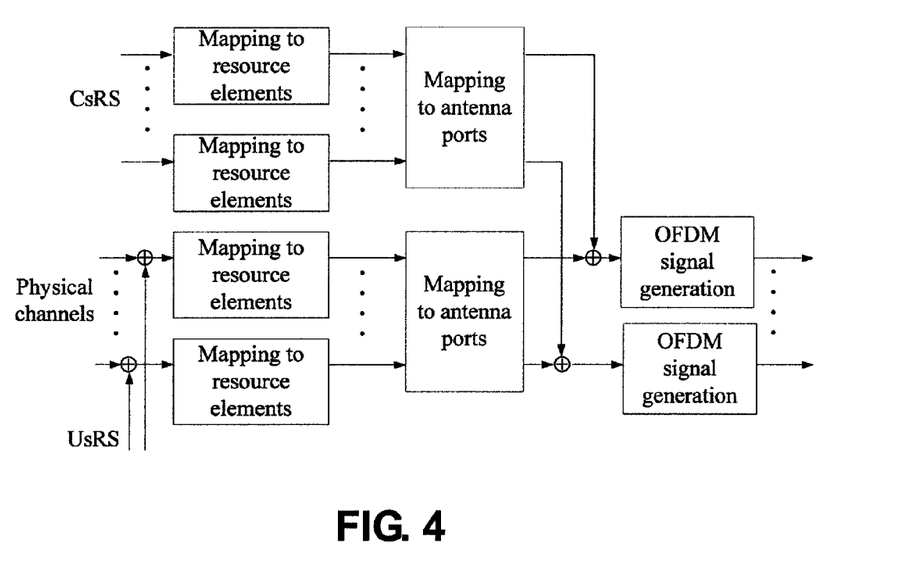
FIG. 4 is a flowchart illustrating another procedure of performing resource mapping and antenna port mapping according to an embodiment of the present invention.

Preferably, the processing procedure shown in FIG. 4 may be adopted. The UsRS and the physical channel data are processed together through resource mapping and then antenna port mapping. OFDM signals are generated based on the modulation symbols processed through the antenna port mapping and are transmitted via the physical antennas.

In addition, the two processing procedures in the above situation B may further include processing of CsRS. The CsRS may be independently mapped onto resources and antenna ports. And OFDM signals are generated based on the modulation symbols obtained by mapping the CsRS together with the modulation symbols obtained by mapping the UsRS and the physical channel data, and then are transmitted via the physical antennas.

Figure 5:
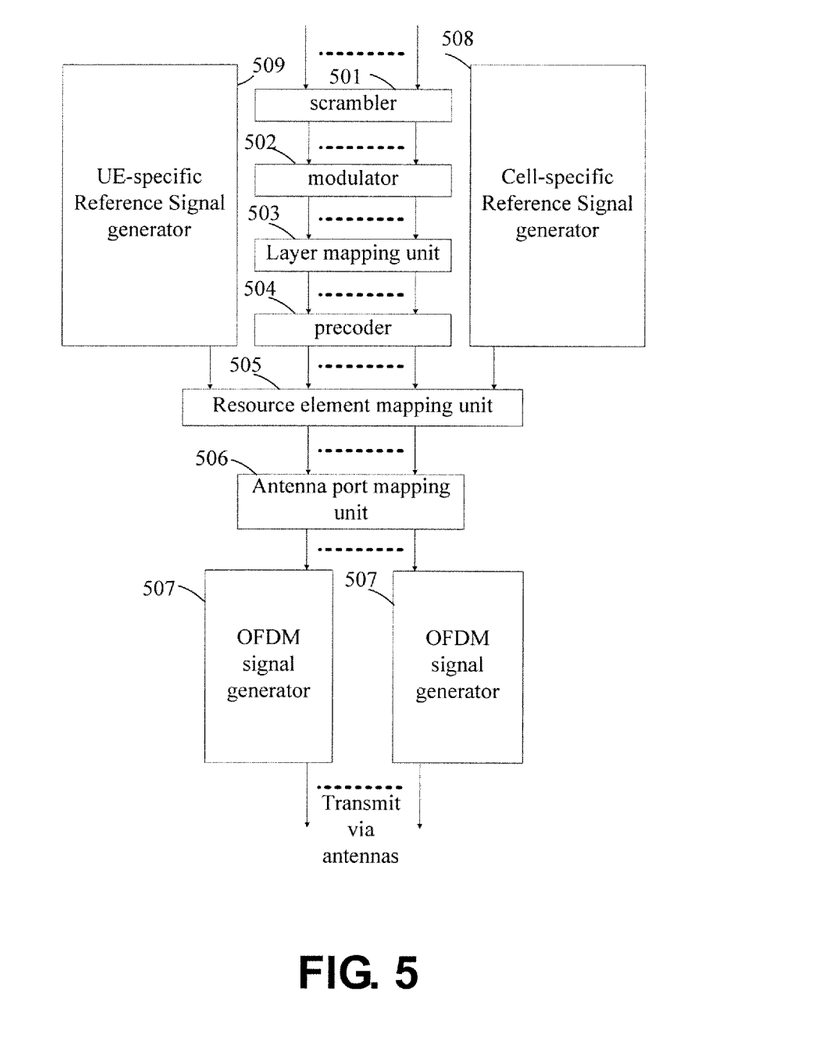
FIG. 5 is a schematic illustrating a structure of an apparatus for data transmission according to an embodiment of the present invention.

According to an embodiment of the present invention, a structure of an apparatus for data transmission is shown in FIG. 5. The apparatus includes: a scrambler 501, a modulator 502, a layer mapping unit 503, a precoder 504, a resource element mapping unit 505, an antenna port mapping unit 506, an OFDM signal generator 507, a CsRS generator 508 and a UsRS generator 509.

The scrambler 501 is adapted to scramble coded bits in each code word to be transmitted in a physical channel and to transmit the scrambled bits to the modulator 502.

The modulator 502 is adapted to receive the scrambled bits from the scrambler 501, modulate the scrambled bits to form complex-valued modulation symbols and to transmit the complex-valued modulation symbols to the layer mapping unit 503.

The layer mapping unit 503 is adapted to receive the complex-valued modulation symbols from the modulator 502, to map the complex-valued modulation symbols onto one or more transmission layers, and to transmit the complex-valued modulation symbols mapped onto the transmission layers to the precoder 504.

The precoder 504 is adapted receive the complex-valued modulation symbols mapped onto the transmission layers from the layer mapping unit 503, to precode the complex-valued modulation symbols on each layer for transmission on one or more antenna ports, and to transmit the complex-valued modulation symbols precoded onto the antenna ports to the resource element mapping unit 505.

The resource element mapping unit 505 is adapted to receive the complex-valued modulation symbols precoded onto the antenna ports from the precoder 504, to map the complex-valued modulation symbols for each antenna port onto resource elements, and to transmit the modulation symbols to the antenna port mapping unit 506.

The antenna port mapping unit 506 is adapted to receive the modulation symbols including data to be transmitted and reference signals from the resource element mapping unit 505, to map the modulation symbols onto corresponding physical antenna elements respectively according to a mapping rule configured by the antenna port mapping unit 506, and to transmit the modulation symbols to the OFDM signal generator 507.

The OFDM signal generator 507 is adapted to receive the modulation symbols mapped onto the physical antenna elements from the antenna port mapping unit 506, to generate complex-valued time-domain OFDM signals for each physical antenna element and to transmit the complex-valued time-domain OFDM signals through corresponding physical antenna elements.

If beamforming is not to be performed, the apparatus may further include a CsRS generator 508, adapted to generate CsRS and to transmit the CsRS to the resource element mapping unit 505.

In this case, the resource element mapping unit 505 is further adapted to receive the CsRS from the CsRS generator 508, to map the modulation symbols including the CsRS and data which is to be transmitted and which is precoded onto the antenna ports onto resource elements, and to transmit the modulation symbols to the antenna port mapping unit 506.

If the beamforming is to be performed, the apparatus may further include a UsRS generator 509, adapted to generate UsRS and to transmit the UsRS to the resource element mapping unit 505.

In this case, the resource element mapping unit 505 is further adapted to receive the UsRS from the UsRS generator 509, to map the modulation symbols including the UsRS and the data which is to be transmitted and which is precoded onto the antenna ports to resource elements, and to transmit the modulation symbols to the antenna port mapping unit 506.

Preferably, the apparatus may further include the CsRS generator 508, adapted to generate CsRS and to transmit the CsRS to the resource element mapping unit 505.

In this case, the resource element mapping unit 505 is further adapted to receive the CsRS from the CsRS generator 508, to receive the UsRS from the UsRS generator 509, to map the modulation symbols including the CsRS, the UsRS and the data which is to be transmitted and which is precoded onto antenna ports to resource elements, and to transmit the modulation symbols to the antenna port mapping unit 506.

In view of the above, the method and apparatus for data transmission provided by the embodiments of the present invention realizes beamforming which is not provided with detailed solution in existing specifications. The present invention is enabled by introducing the concept of antenna ports, wherein antenna ports of type one maintain the functions in existing specifications, and antenna ports of type two are introduced for beamforming. The UE-specific reference signal is also introduced for the beamforming. The antenna ports of type two may be maintained in the system but are not used when no beamforming is required. Meanwhile, by establishing mapping relationships between the physical antenna elements and the antenna ports, the system may support beamforming transmission in frequency-domain flexibly and support various antenna transmission methods in the prior art at the same time, which greatly improves the flexibility of the data transmission of the system.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. An apparatus for data transmission, comprising:
a resource element mapping unit for
receiving modulation symbols which comprise data to be transmitted and reference signals,
mapping modulation symbols to be beamformed onto resource elements of a first group of antenna ports
mapping modulation symbols not to be beamformed onto resource elements of a second group of antenna ports and
transmitting the modulation symbols which comprise the data to be transmitted and the reference signals to the antenna port mapping unit;
an antenna port mapping unit for
receiving the modulation symbols comprising the data to be transmitted and the reference signals from the resource element mapping unit,
mapping the modulation symbols onto physical antenna elements corresponding to the antenna ports, whose resource elements the modulation symbols are mapped onto, according to a mapping rule defined by the antenna port mapping unit, and
transmitting the modulation symbols to the OFDM signal generator;
an OFDM signal generator for
generating, for each antenna port, complex-valued time-domain OFDM signals on the antenna port based on all complex-valued modulation symbols mapped to resource elements of the antenna port, and
transmitting the OFDM signals via physical antenna elements corresponding to the antenna port;

a Cell-specific Reference Signal (CsRS) generator for generating CsRS and transmitting the CsRS to the resource element mapping unit; and a User-specific Reference Signal (UsRS) generator for generating UsRS and transmitting the UsRS to the resource element mapping unit;

wherein the antenna port mapping unit comprises a beamforming port mapping unit and a non-beamforming port mapping unit;

wherein the resource element mapping unit is to receive the CsRS transmitted by the CsRS generator, to map the modulation symbols which comprise the CsRS and the data to be transmitted and which are allocated to the second group of antenna ports onto resource elements, and to transmit the modulation symbols to the non-beamforming port mapping unit; and wherein the resource element mapping unit is to receive the UsRS transmitted by the UsRS generator, to map the modulation symbols which comprise the UsRS and the data to be transmitted and which are allocated to the first group of antenna ports onto resource elements, and to transmit the modulation symbols to the beamforming port mapping unit.

* * * * *